(12) United States Patent
Leung (10) Patent No.: US 8,526,394 B2
(45) Date of Patent: Sep. 3, 2013

(54) METHOD AND SYSTEM FOR HARD HANDOFF IN A BROADCAST COMMUNICATION SYSTEM

(75) Inventor: Nikolai K. N. Leung, Takoma Park, MD (US)

(73) Assignee: QUALCOMM Incorporated, San Diego, CA (US)

( * ) Notice: Subject to any disclaimer, the term of this patent is extended or adjusted under 35 U.S.C. 154(b) by 1532 days.

(21) Appl. No.: 11/514,638

(22) Filed: Aug. 31, 2006

(65) Prior Publication Data

US 2007/0002798 A1 Jan. 4, 2007

Related U.S. Application Data (63) Continuation of application No. 10/038,184, filed on Oct. 24, 2001, now Pat. No. 7,336,952.

(51) Int. Cl.
*H04Q 7/00* (2006.01)

(52) U.S. Cl.
USPC ........... 370/331; 370/350; 370/328; 455/436; 455/439

(58) Field of Classification Search
USPC .................. 370/331, 350, 328; 455/436, 439
See application file for complete search history.

(56) References Cited

U.S. PATENT DOCUMENTS

| | | | |
|---|---|---|---|
| 4,901,307 A | 2/1990 | Gilhousen et al. | |
| 5,103,459 A | 4/1992 | Gilhousen et al. | |
| 5,243,653 A | 9/1993 | Malek et al. | |
| 5,267,261 A | 11/1993 | Blakeney, II et al. | |
| 5,504,773 A | 4/1996 | Padovani et al. | |
| 5,633,868 A | 5/1997 | Baldwin et al. | |
| 5,933,462 A | 8/1999 | Viterbi et al. | |
| 5,933,787 A | 8/1999 | Gilhousen et al. | |
| 6,002,678 A | 12/1999 | Jayapalan et al. | |
| 6,016,662 A | 1/2000 | Tanaka et al. | |
| 6,018,662 A | 1/2000 | Periyalwar et al. | |
| 6,128,483 A * | 10/2000 | Doiron et al. ................. | 455/419 |
| 6,137,840 A | 10/2000 | Tiedemann, Jr. et al. | |
| 6,246,883 B1 | 6/2001 | Lee | |

(Continued)

FOREIGN PATENT DOCUMENTS

| | | |
|---|---|---|
| CN | 1253700 A | 5/2000 |
| CN | 1308821 A | 8/2001 |

(Continued)

OTHER PUBLICATIONS

International Preliminary Examination Report—PCT/US02/034017, IPEA/US—Jan. 25, 2006.

(Continued)

*Primary Examiner* — Danh Le
(74) *Attorney, Agent, or Firm* — Kevin T. Cheatham (57) ABSTRACT

A method and system for a handoff in a broadcast communication system is disclosed. A subscriber-assisted handoff is impractical in a broadcast communication system due to e.g., a high signaling load, a difficulty to synchronize the broadcast transmission. On the other hand, the small number of broadcast channels enables the subscriber station to perform the handoff autonomously. While performing a handoff between broadcast transmissions, a disruption of service occurs due to lack of synchronization among the broadcast transmissions. To reduce the service disruption, upon detecting a need for handoff, the lower layers inform the application layer about the forthcoming handoff. The application layer thus may take measures to reduce or prevent the disruption.

16 Claims, 8 Drawing Sheets

(56) References Cited

U.S. PATENT DOCUMENTS

| | | | |
|---|---|---|---|
| 6,353,602 B1 * | 3/2002 | Cheng et al. | 370/332 |
| 6,366,781 B1 * | 4/2002 | Hussain et al. | 455/456.5 |
| 6,535,739 B1 | 3/2003 | Chen et al. | |
| 6,542,744 B1 | 4/2003 | Lin | |
| 6,556,834 B1 | 4/2003 | Kobayashi et al. | |
| 6,558,154 B2 | 5/2003 | Eroglu et al. | |
| 6,570,856 B1 | 5/2003 | Freeburg et al. | |
| 6,574,211 B2 | 6/2003 | Padovani et al. | |
| 6,618,438 B1 | 9/2003 | Le Roux et al. | |
| 6,681,115 B1 | 1/2004 | McKenna et al. | |
| 6,728,233 B1 | 4/2004 | Park et al. | |
| 6,731,936 B2 | 5/2004 | Chen et al. | |
| 6,754,494 B1 * | 6/2004 | Yoshimura | 455/436 |
| 6,782,261 B1 * | 8/2004 | Ahmed et al. | 455/436 |
| 6,839,339 B1 | 1/2005 | Chuah | |
| 6,980,820 B2 | 12/2005 | Sinnarajah et al. | |
| 6,993,338 B2 | 1/2006 | Lee et al. | |
| 7,072,311 B1 * | 7/2006 | Czaja et al. | 370/318 |
| 7,158,497 B2 | 1/2007 | Li et al. | |
| 7,336,952 B2 | 2/2008 | Leung | |
| 2002/0031125 A1 | 3/2002 | Sato | |
| 2002/0126701 A1 | 9/2002 | Requena | |
| 2002/0142757 A1 | 10/2002 | Leung et al. | |
| 2002/0188753 A1 | 12/2002 | Tang et al. | |
| 2003/0012217 A1 | 1/2003 | Andersson et al. | |

FOREIGN PATENT DOCUMENTS

| | | |
|---|---|---|
| JP | 11069437 | 3/1999 |
| JP | 11514172 | 11/1999 |
| JP | 2000308108 A | 11/2000 |
| JP | 2001025007 A | 1/2001 |
| JP | 2001244878 A | 9/2001 |
| JP | 2001244993 | 9/2001 |
| WO | 9825432 A2 | 6/1998 |
| WO | WO0005910 A1 | 2/2000 |
| WO | 0131940 A2 | 5/2001 |
| WO | 01045308 | 6/2001 |
| WO | 0167788 | 9/2001 |
| WO | 01072076 | 9/2001 |

OTHER PUBLICATIONS

International Search Report—PCT/US02/034017, International Search Authority—European Patent Office—May 27, 2003.

Written Opinion—PCT/US02/034017, International Search Authority—IPEA/US—Aug. 8, 2005.

European Search Report —EP10170155, Search Authority—Munich Patent Office, Aug. 31, 2010.

* cited by examiner

| Field | Length (octets) |
|---|---|
| CONTROL | 1 |
| CURRENT_SDP_ID | 1 |
| CURRENT_SDP_LIFE | 6 |
| NEXT_SDP_ID | 0 or 1 |
| INCL_SDP_DESC_ID | 0 or 1 |
| INCL_SDP_DESC | 0 or Variable |

METHOD AND SYSTEM FOR HARD HANDOFF IN A BROADCAST COMMUNICATION SYSTEM

CLAIM OF PRIORITY UNDER 35 U.S.C. §120

The present Application for Patent is a Continuation and claims priority to patent application Ser. No. 10/038,184 entitled "Method and System for Hard Handoff in a Broadcast Communication System" filed Oct. 24, 2001, U.S. Pat. No. 7,336,952 and assigned to the assignee hereof and hereby expressly incorporated by reference herein.

BACKGROUND

1. Field

The present invention relates to broadcast communications, otherwise known as point-to-multipoint communications, in a wireless communication system. More particularly, the present invention relates to a system and method for hard handoff in such a broadcast communication system.

2. Background

Communication systems have been developed to allow transmission of information signals from an origination station to a physically distinct destination station. In transmitting an information signal from the origination station over a communication channel, the information signal is first converted into a form suitable for efficient transmission over the communication channel. Conversion, or modulation, of the information signal involves varying a parameter of a carrier wave in accordance with the information signal in such a way that the spectrum of the resulting modulated carrier is confined within the communication channel bandwidth. At the destination station the original information signal is replicated using the received modulated carrier wave. Such a replication is generally achieved by using an inverse of the modulation process employed by the origination station.

Modulation also facilitates multiple-access, i.e., simultaneous transmission and/or reception, of several signals over a common communication channel. Multiple-access communication systems often include a plurality of subscriber units requiring intermittent service of relatively short duration rather than continuous access to the common communication channel. Several multiple-access techniques are known in the art, such as time division multiple-access (TDMA), frequency division multiple-access (FDMA), and amplitude modulation multiple-access (AM). Another type of a multiple-access technique is a code division multiple-access (CDMA) spread spectrum system that conforms to the "TIA/EIA/IS-95 Mobile Station-Base Station Compatibility Standard for Dual-Mode Wide-Band Spread Spectrum Cellular System," hereinafter referred to as the IS-95 standard. The use of CDMA techniques in a multiple-access communication system is disclosed in U.S. Pat. No. 4,901,307, entitled "SPREAD SPECTRUM MULTIPLE-ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention.

A multiple-access communication system may be a wireless or wire-line and may carry voice and/or data. An example of a communication system carrying both voice and data is a system in accordance with the IS-95 standard, which specifies transmitting voice and data over the communication channel. A method for transmitting data in code channel frames of fixed size is described in detail in U.S. Pat. No. 5,504,773, entitled "METHOD AND APPARATUS FOR THE FORMATTING OF DATA FOR TRANSMISSION", assigned to the assignee of the present invention. In accordance with the IS-95 standard, the data or voice is partitioned into code channel frames that are 20 milliseconds wide with data rates as high as 14.4 Kbps. Additional examples of a communication systems carrying both voice and data comprise communication systems conforming to the "3rd Generation Partnership Project" (3GPP), embodied in a set of documents including Document Nos. 3G TS 25.211, 3G TS 25.212, 3G TS 25.213, and 3G TS 25.214 (the W-CDMA standard), or "TR-45.5 Physical Layer Standard for cdma2000 Spread Spectrum Systems" (the IS-2000 standard).

An example of a data only communication system is a high data rate (HDR) communication system that conforms to the TIA/EIA/IS-856 industry standard, hereinafter referred to as the IS-856 standard. This HDR system is based on a communication system disclosed U.S. Pat. No. 6,574,211, entitled "METHOD AND APPARATUS FOR HIGH RATE PACKET DATA TRANSMISSION," issued Jun. 3, 2003, and assigned to the assignee of the present invention. The HDR communication system defines a set of data rates, ranging from 38.4 kbps to 2.4 Mbps, at which an access point (AP) may send data to a subscriber station (access terminal, AT). Because the AP is analogous to a base station, the terminology with respect to cells and sectors is the same as with respect to voice systems.

In a multiple-access communication system, communications between users are conducted through one or more base stations. A first user on one subscriber station communicates to a second user on a second subscriber station by transmitting data on a reverse link to a base station. The base station receives the data and can route the data to another base station. The data is transmitted on a forward link of the same base station, or the other base station, to the second subscriber station. The forward link refers to transmission from a base station to a subscriber station and the reverse link refers to transmission from a subscriber station to a base station. Likewise, the communication can be conducted between a first user on one subscriber station and a second user on a landline station. A base station receives the data from the user on a reverse link, and routes the data through a public switched telephone network (PSTN) to the second user. In many communication systems, e.g., IS-95, W-CDMA, IS-2000, the forward link and the reverse link are allocated separate frequencies.

The above described wireless communication service is an example of a point-to-point communication service. In contrast, broadcast services provide point-to-multipoint communication service. The basic model of a broadcast system consists of a broadcast net of users served by one or more central stations, which transmit information with a certain contents, e.g., news, movies, sports events and the like to the users. Each broadcast net user's subscriber station monitors a common broadcast forward link signal. Because the central station fixedly determines the content, the users are generally not communicating back. Examples of common usage of broadcast services communication systems are TV broadcast, radio broadcast, and the like. Such communication systems are generally highly specialized purpose-build communication systems. With the recent, advancements in wireless cellular telephone systems there has been an interest of utilizing the existing infrastructure of the—mainly point-to-point cellular telephone systems for broadcast services. (As used herein, the term "cellular" systems encompasses communication systems utilizing both cellular and PCS frequencies.)

When a subscriber station travels outside the boundary of the base station with which the subscriber station currently communicates, it is desirable to maintain the communication link by transferring the call to a different subscriber station. The method and system for providing a communication with a subscriber station through more than one base station during the soft hand-off process are disclosed in U.S. Pat. No. 5,267, 261, entitled "MOBILE ASSISTED SOFT HAND-OFF IN A CDMA CELLULAR TELEPHONE SYSTEM," assigned to the assignee of the present invention. The method and system for providing a softer hand-off is described in detail in U.S. Pat. No. 5,933,787, entitled "METHOD AND APPARATUS FOR PERFORMING HAND-OFF BETWEEN SECTORS OF A COMMON BASE STATION", assigned to the assignee of the present invention. Using these methods, communication between the subscriber stations is uninterrupted by the eventual handoff from an original base station to a subsequent base station. This type of handoff may be considered a "soft" handoff in that communication with the subsequent base station is established before communication with the original base station is terminated. When the subscriber unit is in communication with two base stations, the subscriber unit combines the signals received from each base station in the same manner that multipath signals from a common base station are combined.

Although the described handoff method for point-to-point communication system described above could be applied to broadcast systems, a handoff based on base station-subscriber station signaling message exchange would result in a high signaling load in a broadcast system. The high signaling load is caused by a large number of subscribers monitoring a common broadcast forward channel. Furthermore, as described in the above-cited U.S. Pat. Nos. 5,267,261, and 5,933,787, the transmissions received simultaneously by a subscriber station during handoff are synchronized at the transmitting base stations. Because broadcast transmission is intended for many subscriber stations, the base station cannot synchronize transmission for each subscriber station desiring to handoff. Based on the foregoing, there is a need in the art for a system and method for handoff in such a broadcast communication system.

SUMMARY

Embodiments disclosed herein address the above stated needs by providing a method and a system executing the method by detecting at a physical layer a need for handoff; notifying higher layer about said detected need for handoff; and initiating re-synchronization in accordance with said notifying.

In another aspect of the invention, once the notification was received the initiating re-synchronization is carried out by determining parameters for processing a second broadcast channel transmitted from a second terminal; terminating processing of a first broadcast channel transmitted from a first terminal; and beginning processing of the second broadcast channel in accordance with said determined parameters.

In yet another aspect of the invention, the output of a processed first broadcast channel is synchronized with the output of a processed second broadcast channel before the processing of a first broadcast channel is terminated.

In yet another aspect of the invention, the above stated needs are addressed by providing a method and a system executing the method by processing a broadcast session on a first broadcast channel transmitted from a first terminal in accordance with a first set of parameters; performing a handoff to a second broadcast channel transmitted from a second terminal; and processing a broadcast session on the second broadcast channel in accordance with the first set of parameters if a handoff period is less than lifetime of the broadcast session.

In yet another aspect of the invention, the second set of parameters are acquiring from the first broadcast channel or from the second broadcast channel.

DETAILED DESCRIPTION

Definitions

The word "exemplary" is used herein to mean "serving as an example, instance, or illustration." Any embodiment described herein as "exemplary" is not necessarily to be construed as preferred or advantageous over other embodiments.

The terms point-to-point communication is used herein to mean a communication between two subscriber stations over a dedicated communication channel.

The terms broadcast communication or point-to-multipoint communication are used herein to mean a communication wherein a plurality of subscriber stations are receiving communication from one source.

The term packet is used herein to mean a group of bits, including data (payload) and control elements, arranged into a specific format. The control elements comprise, e.g., a preamble, a quality metric, and others known to one skilled in the art. Quality metric comprises, e.g., a cyclical redundancy check (CRC), a parity bit, and others known to one skilled in the art.

The term access network is used herein to mean a collection of base stations (BS) and one or more base stations' controllers. The access network transports data packets between multiple subscriber stations. The access network may be further connected to additional networks outside the access network, such as a corporate intranet or the Internet, and may transport data packets between each access terminal and such outside networks.

The term base station is used herein to mean the hardware with which subscriber stations communicate. Cell refers to the hardware or a geographic coverage area, depending on the context in which the term is used. A sector is a partition of a cell. Because a sector has the attributes of a cell, the teachings described in terms of cells are readily extended to sectors.

The term subscriber station is used herein to mean the hardware with which an access network communicates. A subscriber station may be mobile or stationary. A subscriber station may be any data device that communicates through a wireless channel or through a wired channel, for example using fiber optic or coaxial cables. A subscriber station may further be any of a number of types of devices including but not limited to PC card, compact flash, external or internal modem, or wireless or wireline phone. A subscriber station that is in the process of establishing an active traffic channel connection with a base station is said to be in a connection setup state. A subscriber station that has established an active traffic channel connection with a base station is called an active subscriber station, and is said to be in a traffic state.

The term physical channel is used herein to mean a communication route over which a signal propagates described in terms of modulation characteristics and coding.

The term logical channel is used herein to mean a communication route within the protocol layers of either the base station or the subscriber station.

The term communication channel/link is used herein to mean a physical channel or a logical channel in accordance with the context.

The term reverse channel/link is used herein to mean a communication channel/link through which the subscriber station sends signals to the base station.

A forward channel/link is used herein to mean a communication channel/link through which a base station sends signals to a subscriber station.

The term hard handoff is used herein to mean a transfer of a communication between a subscriber station and a first sector to a second sector by ending the communication between the subscriber station and the first sector before beginning the communication between a subscriber station and the second sector.

The term soft hand-off is used herein to mean a communication between a subscriber station and two or more sectors, wherein each sector belongs to a different cell. The reverse link communication is received by both sectors, and the forward link communication is simultaneously carried on the two or more sectors' forward links.

The term softer hand-off is used herein to mean a communication between a subscriber station and two or more sectors, wherein each sector belongs to the same cell. The reverse link communication is received by both sectors, and the forward link communication is simultaneously carried on one of the two or more sectors' forward links.

The term erasure is used herein to mean failure to recognize a message.

The term dedicated channel is used herein to mean a channel modulated by information specific to an individual subscriber station.

The term common channel is used herein to mean a channel modulated by information shared among all subscriber stations.

Description

Figure 1:
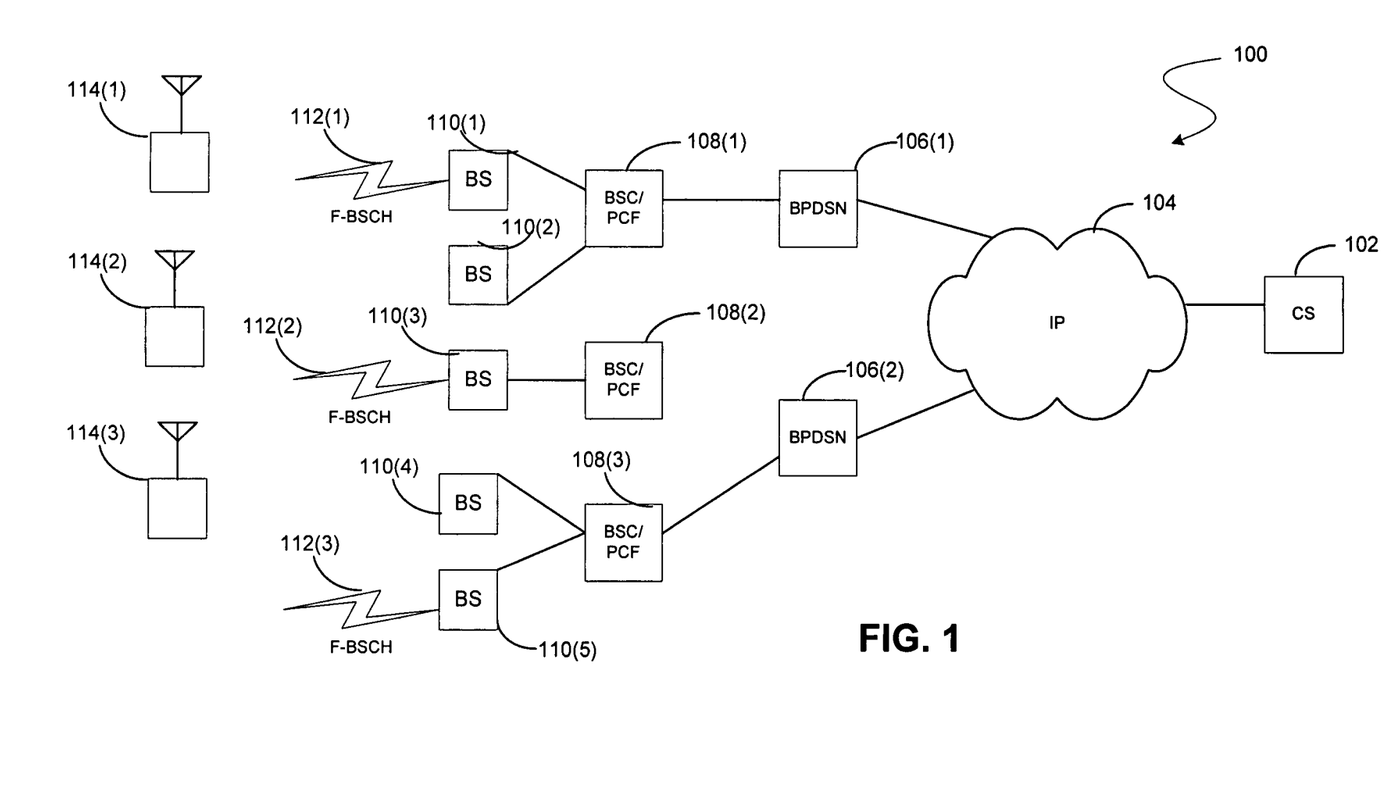
FIG. 1 illustrates conceptual block diagram of a High-Speed Broadcast Service communication system.

As discussed, a basic model of a broadcast system comprises a broadcast net of users, served by one or more central stations, which transmit information with a certain contents, e.g., news, movies, sports events and the like to the users. Each broadcast net user's subscriber station monitors a common broadcast forward link signal. FIG. 1 illustrates conceptual block diagram of a communication system 100, capable of performing High-Speed Broadcast Service (HSBS) in accordance with embodiments of the present invention.

The broadcast content originates at a content server (CS) 102. The content server may be located within the carrier network (not shown) or outside Internet (IP) 104. The content is delivered in a form of packets to a broadcast packet data-serving node (BPDSN) 106. The term BPSDN is used because although the BPDSN may be physically co-located or be identical to the regular PDSN (not shown), the BPDSN may be logically different from a regular PDSN. The BPDSN 106 delivers the packets according to the packet's destination to a packet control function (PCF) 108. The PCF is a control entity controlling function of base stations 110 for the HSBS as a base station controller is for regular voice and data services. To illustrate the connection of the high level concept of the HSBS with the physical access network, FIG. 1 shows a PCF physically co-located or even identical, but logically different from a base station controller (BSC). One of ordinary skills in the art understands that this is for a pedagogical purposes only. The BSC/PCF 108 provides the packets to base stations 110.

The communication system 100 enables High-Speed Broadcast Service (HSBS) by introducing a forward broadcast shared channel (F-BSCH) 112 capable of high data rates transmitted from the base stations 110 that can be received by a large number of subscriber stations 114. The term forward broadcast shared channel is used herein to mean a single forward link physical channel that carries broadcast traffic. A single F-BSCH can carry one or more HSBS channels multiplexed in a TDM fashion within the single F-BSCH. The term HSBS channel is used herein to mean a single logical HSBS broadcast session defined by the session's broadcast content. Each session is defined by a broadcast content that may change with time; for example, 7 am—News, 8 am—Weather, 9 am—Movies, etc.

Because as described, the HSBS channels are multiplexed onto a F-BSCH physical channel, and there are various possibilities for how the HSBS channels could be carried in the F-BSCH channels, the subscriber station needs to know, which HSBS channel is carried on which F-BSCH. Such information is specified by a logical-to-physical mapping. The physical-to-logical mapping for broadcast services is disclosed in U.S. Pat. No. 6,980,820 entitled "A METHOD AND SYSTEM FOR SIGNALING IN BROADCAST COMMUNICATION SYSTEM", issued Dec. 27, 2005, and assigned to the assignee of the present invention. Furthermore, the forward broadcast shared channel comprises various combinations of upper layer protocols, based on the type of content being delivered. The subscriber station, therefore, further requires information relating to these upper layer protocols for interpretation of the broadcast transmissions.

The different options of arranging the HSBS services are referred to as HSBS service option. In general the HSBS service option is defined by a protocol stack, options in the protocol stack; and procedures for setting up and synchronizing the service. The HSBS service option can be provided to the subscriber station via out-of-band methods, i.e., via transmission of the HSBS service option via a separate channel distinct from the broadcast channel. Alternatively, the HSBS service option can be provided to the subscriber station via in-band methods, wherein the HSBS service option is multiplexed with the information content of the HSBS channel. The HSBS service option description can utilize protocols known to one of ordinary skills in the art. One of such protocol description of the application and transport layers comprises a Session Description Protocol (SDP). Session Description Protocol is a defined format for conveying sufficient information to discover and participate in a multimedia or other broadcast type session. In one example, an SDP is specified in RFC 2327 entitled "SDP: Session Description Protocol" by M. Handley and V. Jacobson, dated April 1998, which is hereby expressly incorporated by reference herein. Detailed description for providing protocol options is disclosed in U.S. Publication No. 2002/0142757 entitled "METHOD AND APPARATUS FOR BROADCAST SIGNALING IN A WIRELESS COMMUNICATION SYSTEM," published Oct. 3, 2002, and assigned to the assignee of the present invention.

Hard Handoff on a Common Broadcast Forward Link

To enhance the Common Broadcast Forward Link performance, soft and softer handoffs are desirable in overlapped coverage areas of different sectors. The method and system for providing a communication with a subscriber station through more than one base station during the soft hand-off process are disclosed in U.S. Pat. No. 6,731,936, entitled "METHOD AND SYSTEM FOR A HANDOFF IN A BROADCAST COMMUNICATION SYSTEM," issued May 4, 2004, and assigned to the assignee of the present invention.

Figure 2:
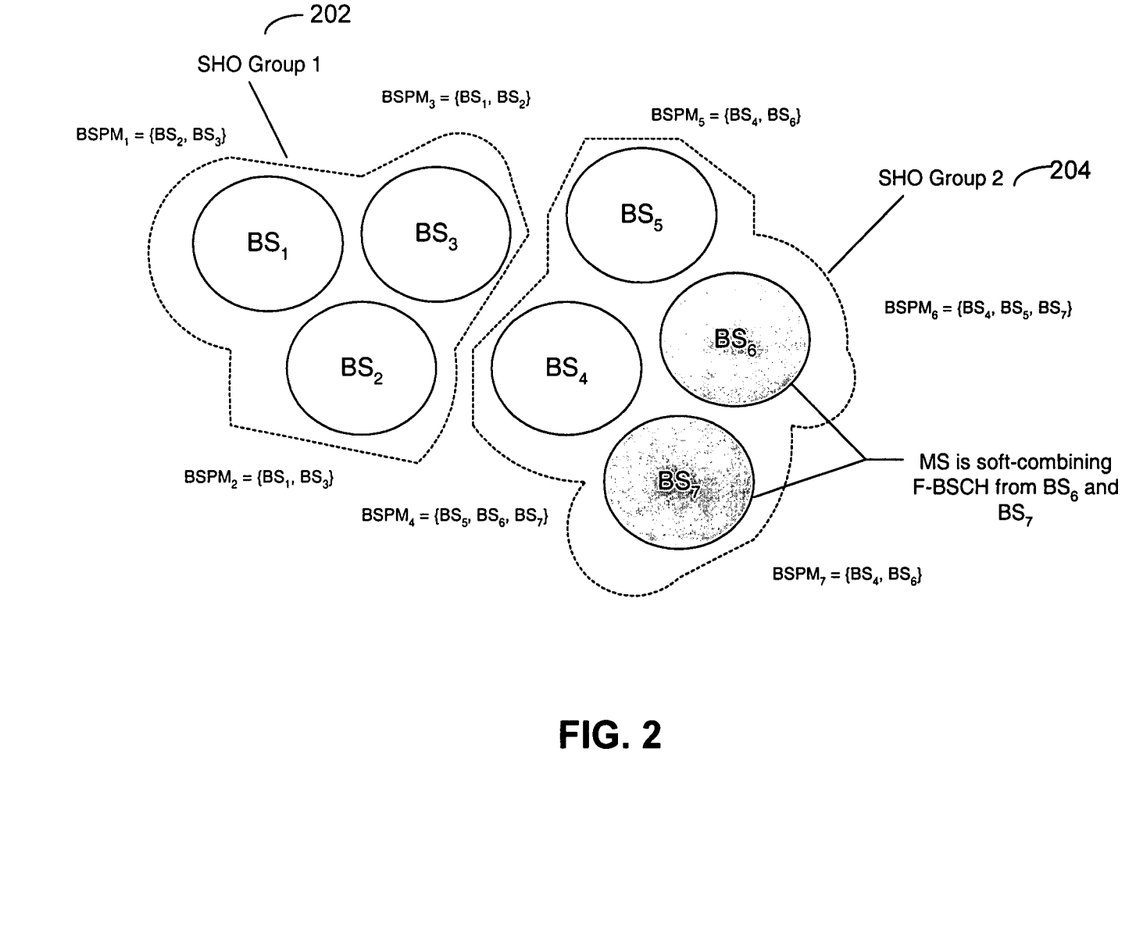
FIG. 2 illustrates concept of soft-handoff groups in a broadcast communication system.

Although the described soft and softer handoff method is desirable because the subscriber station does not experience a discontinuity in transmitted information, such methods cannot always be utilized in a broadcast communication system. A subscriber station may soft-combine only synchronous transmissions; consequently, the subscriber station may perform a soft and softer handoff only between base stations that belong to the same soft handoff (SHO) group. As used herein a SHO group means a group of all Base Stations transmitting the Common Broadcast Forward Link simultaneously and synchronously. FIG. 2 illustrates two SHOs, one comprising $BS_1$, $BS_2$, and $BS_3$, the other comprises $BS_4$, $BS_5$, $BS_6$, and $BS_7$. Consequently, if the subscriber station crosses boundaries from a coverage area of SHO Group 1 202 to a coverage area of SHO Group 2 204, a hard handoff is required.

When the subscriber station performs a hard handoff between two cells/sectors that are not synchronized, e.g., $BS_2$ and $BS_4$, the broadcast stream of the $BS_2$ may be advanced or delayed with respect to the broadcast stream of the $BS_4$. Furthermore, because a handing off from one broadcast stream to another broadcast stream takes some time, the broadcast session, consequently, a service option, may change. To prevent the subscriber station from incorrectly decoding the broadcast stream of the $BS_4$ the subscriber station needs to perform re-synchronization procedures when such a hard handoff occurs. The term re-synchronization as used means processing necessary to provide user with outputting of the broadcast service content after the handoff. During the re-synchronization procedures after a hard handoff, the decoding and outputting of the broadcast service content is interrupted. This interruption can be annoying to the user and should be eliminated, or at least minimized.

In accordance with known handoff methods as described in, e.g., the above-referenced U.S. Pat. Nos. 5,267,261 and 5,933,787, the need for handoff is detected by layer 1 of the International Standards Organization (ISO) Open System Interconnection (OSI) layering model, and the handoff is supported by layer 3 of the OSI. These layers are hereinafter referred to as lower layers. Layers above layer 3 of the OSI (hereinafter higher layers) are not notified or involved in the handoff. In accordance with the embodiments of the present invention, when the subscriber station determines a need for handoff at the lower layers, e.g., the physical layer, the higher layer are notified about the upcoming handoff. Upon receiving the notification, the higher layers initiate re-synchronization method.

Figure 3:
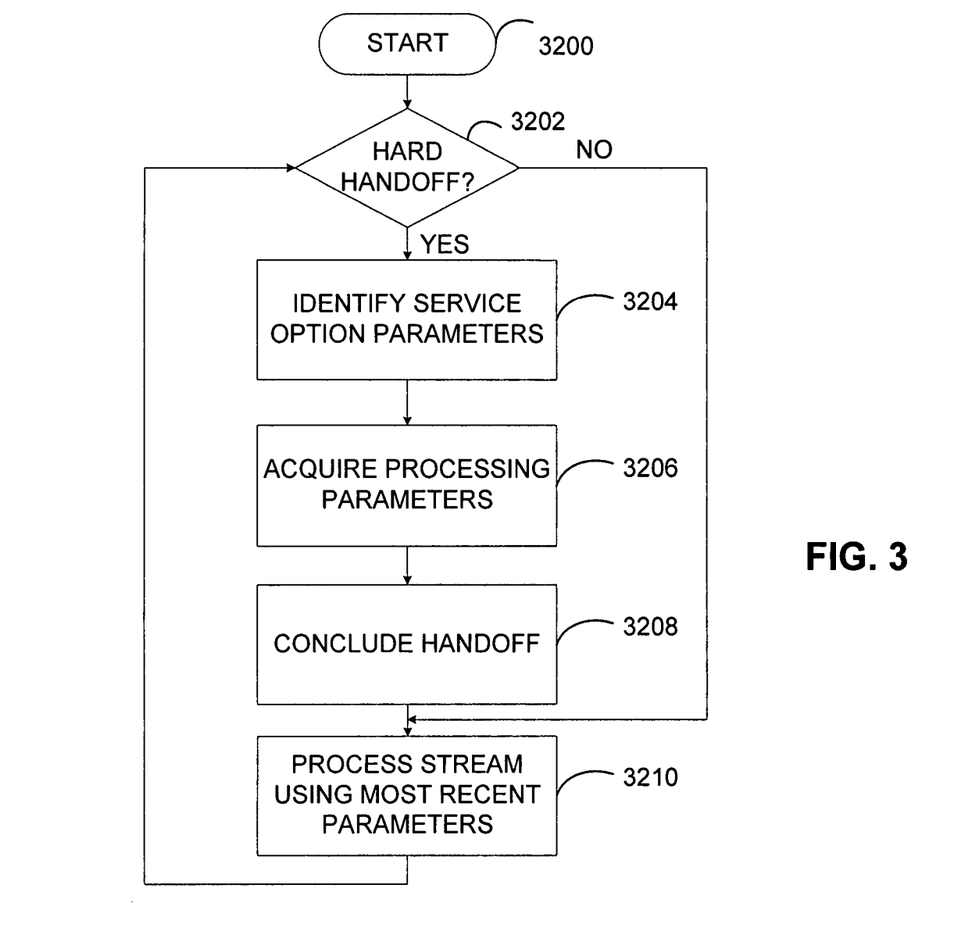
FIG. 3 illustrates re-synchronization in accordance with one embodiment.

FIG. 3 illustrates re-synchronization in accordance with one embodiment. The method starts in step 3200 and continues in step 3202.

In step 3202, the need for hard handoff is tested. If the test is positive, the method continues in step 3204, otherwise, the method continues in step 3210.

In step 3204, the subscriber station, which is receiving a broadcast session on a broadcast channel transmitted form a first terminal (an old broadcast stream) acquires a a broadcast session on a broadcast channel transmitted form a second terminal (new broadcast stream), acquires the new broadcast stream, and searches the new broadcast stream for the service option information, e.g., a header compression protocol and decompression state, and session description protocol (SDP), while simultaneously decoding the full content of the old broadcast stream. Because the subscriber station does not need to decode the session content of the new stream, the subscriber station does not to expand significant processing power. Once the subscriber station identifies the service option information, the method continues in step 3206.

In step 3206, the subscriber station decodes the identified service option information, thus, acquiring the parameters necessary for processing the new broadcast stream. The method continues in step 3208.

In step 3208, the subscriber station concludes the handoff by ending decoding and outputting the old broadcast stream. The method continues in step 3210.

In step 3210, the subscriber station decodes and outputs the received broadcast stream, using the most recent parameters.

As discussed above, the old broadcast stream and the new broadcast stream are not synchronized, which may cause discontinuity in the output information. Furthermore, the time interval between the ending decoding and outputting the old broadcast stream and starting decoding and outputting the new broadcast stream may cause discontinuity in the output information. To minimize or prevent such discontinuities, in another embodiment, the subscriber station further determines the timing of the old broadcast stream and the new broadcast stream and uses this information to re-align outputting the information content.

Figure 4:
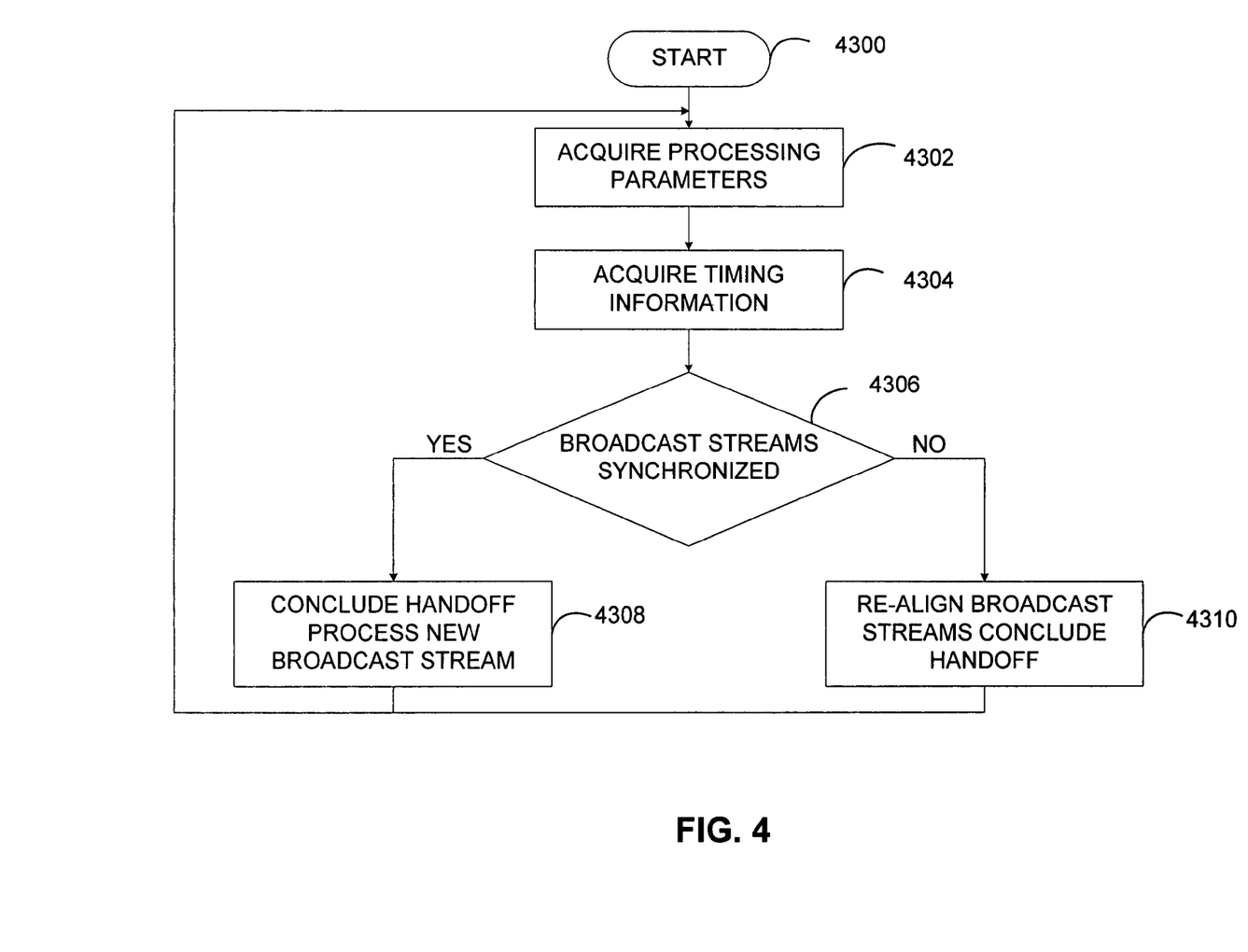
FIG. 4 illustrates broadcast stream re-alignment in accordance with one embodiment.

FIG. 4 illustrates re-alignment in accordance with one embodiment. The method starts in step 4300 and continues in step 4302.

In step 4302, upon detecting the need for handoff, the subscriber station acquires the new broadcast stream, identifies and decodes service option information for the new stream. The method of step 4302 may comprise steps 3204 and 3206 of FIG. 3. The method continues in step 4304.

In step 4304, the subscriber station further decodes timing information of the new broadcast stream. The timing information can be acquired for example from a time stamp of broadcast stream information content. Alternatively, the timing information can be acquired from a sequence numbers of broadcast stream information units. The method continues in step 4306.

In step 4306, the subscriber station determines whether the broadcast streams are synchronized. If the broadcast streams are synchronized, the method continues in step 4308; otherwise, the method continues in step 4310.

In step 4308, the subscriber station starts decoding the new broadcast stream, and when the subscriber station is ready to output the decoded new broadcast stream, the subscriber station concludes the handoff by ending decoding and outputting the old broadcast stream and starting outputting the new broadcast stream. The method returns to step 4302.

In step 4310, the subscriber station determines the relative timing of the old broadcast stream and the new broadcast stream. Further re-alignment depends on the relative timing of the broadcast streams. After re-aligning the broadcast streams, the subscriber station concludes the handoff, and the method returns to step 4302.

Figure 5:
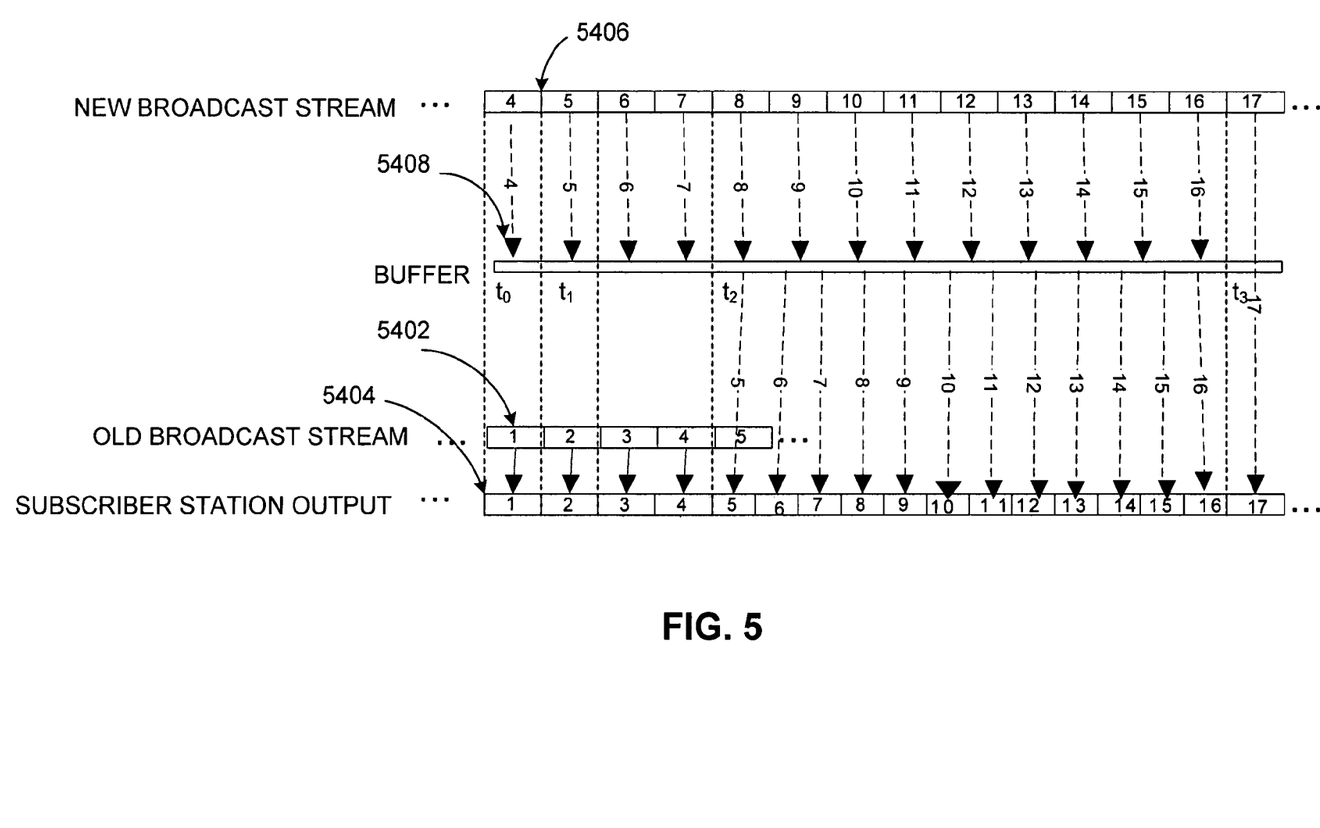
FIG. 5 illustrates the broadcast stream re-alignment when the new broadcast stream is advanced relative to the old broadcast stream.

FIG. 5 illustrates the scenario, when the new broadcast stream is advanced relative to the old broadcast stream. At time $t_0$, the subscriber station is decoding the information content of the old broadcast stream 5402, and outputting the decoded information content 5404. Simultaneously, the subscriber station decodes the information content of the new broadcast stream 5406, and determines timing indicated by sequence numbers of units of the new broadcast stream 5406. At time $t_1$, the subscriber station starts accumulating units of the new broadcast stream 5406 into a buffer 5408. At time $t_2$ the first unit stored in the buffer 5408 has the same sequence number (5) as the unit of the old broadcast stream 5402 to be outputted. Consequently, the subscriber station starts outputting the units from the buffer 5408, and discontinues decoding and receiving of the old broadcast stream 5404. To eliminate the delay between the content of the buffer 5408 and the units being received and decoded from the new broadcast stream 5406, the subscriber station outputs the buffered units faster then the units are being received. In time $t_3$, there are no more units in the buffer 5408 and the new broadcast stream 5406 unit (17) is aligned with the expected unit (17) at the output 5404, consequently, the subscriber station discontinues the units buffering, and provides the units directly to the output.

Figure 6:
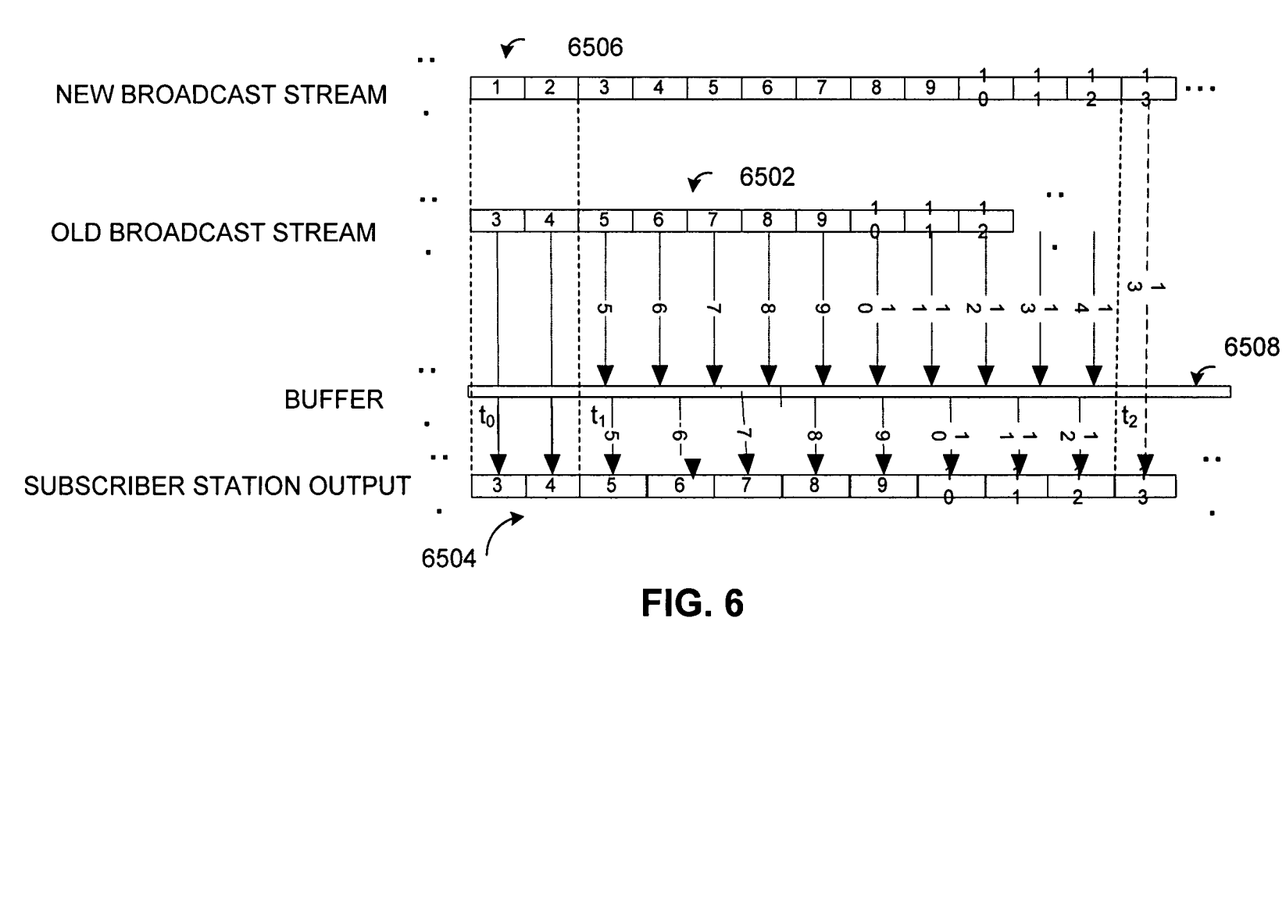
FIG. 6 illustrates the broadcast stream re-alignment when the new broadcast stream is delayed relative to the old broadcast stream.

FIG. 6 illustrates the scenario, when the new broadcast stream is delayed relative to the old broadcast stream. At time $t_0$, the subscriber station is decoding the information content of the old broadcast stream 6502, and outputting the decoded information content 6504. Simultaneously, the subscriber station decodes the information content of the new broadcast stream 6506, and determines timing indicated by sequence numbers of units of the new broadcast stream 6506. At time $t_1$, the subscriber station starts accumulating units of the old broadcast stream 6502 into a buffer 6508, and outputs the units from the buffer 6508 slower then the units from the new broadcast stream 6506 are being received. At time $t_2$, the last unit stored in the buffer 6508 has the same sequence number (13) as the unit of the new broadcast stream 6506 to be outputted. Consequently, the subscriber station stops outputting the units from the buffer 6508, discontinues decoding and receiving of the old broadcast stream 6502, and starts outputting units form the new broadcast stream 6506.

Usually, the two content streams have identical protocol options. The only time, when the protocol options are different before and after handoff is when the subscriber station performs a handoff during the time the session changes. In another embodiment, the subscriber station takes advantage of the fact that the old stream may contain information about the next session.

Figure 7:
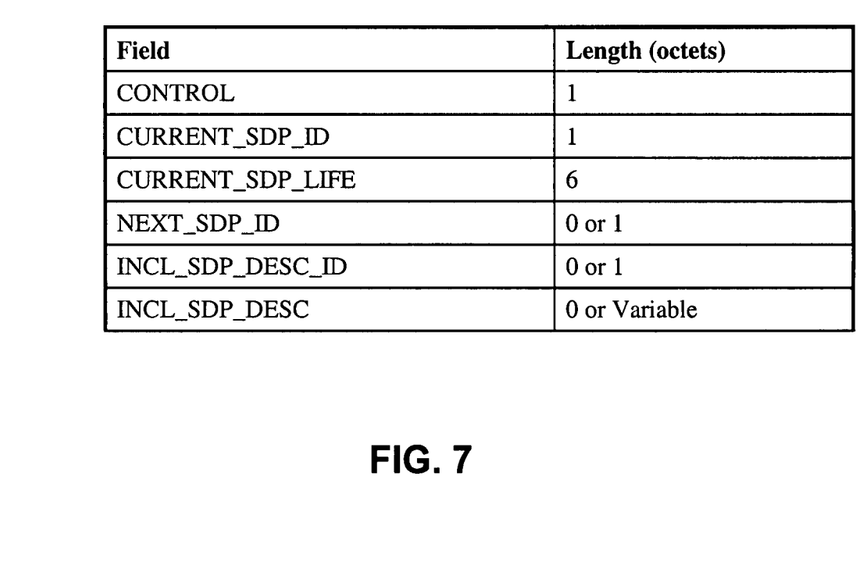
FIG. 7 illustrates a Protocol Data Unit in accordance with one embodiment.

As described in the above-referenced U.S. Publication No. 2002/0142257, the session description protocol (SDP), describing the broadcast session, may be transmitted as a Protocol Data Unit (PDU), including multiple predefined fields as illustrated in FIG. 7. The length of the fields are given according to one embodiment, but may be varied according to the design goals and constraints of a given system. The description of the PDU fields is as follows:

CONTROL identifies the format of the PDU, and indicates whether fields NEXT_SDP_ID, INCL_SDP_DESC_ID, and INCL_SDP_DESC are included in the PDU.

CURRENT_SDP_ID identifies the currently active SDP description, i.e., the description currently used for encoding and processing the broadcast session content.

CURRENT_SDP_LIFE indicates a time for which the current SDP is valid.

NEXT_SDP_ID identifies SDP for the next session. The can use this ID to retrieve the SDP of the next session before the next session starts.

INCL_SDP_DESC_ID identifies the SDP that may be included in the PDU.

The SDP may be the current description, SDP for the next session, or SDP for any future sessions. Sending SDPs for future sessions allows the subscriber station to store the SDPs for viewing the future content without retrieving the SDP directly from the server.

INCL_SDP_DESC the SDP for a particular session. Sending this SDP prevents subscriber stations from having to individually retrieve the SDP description from the content server. However, the SDP requires high bandwidth, it is recommended that the INCL_SDP_DESC is sent only prior to and after the session parameters have changed (i.e., at the boundary between two sessions).

Figure 8:
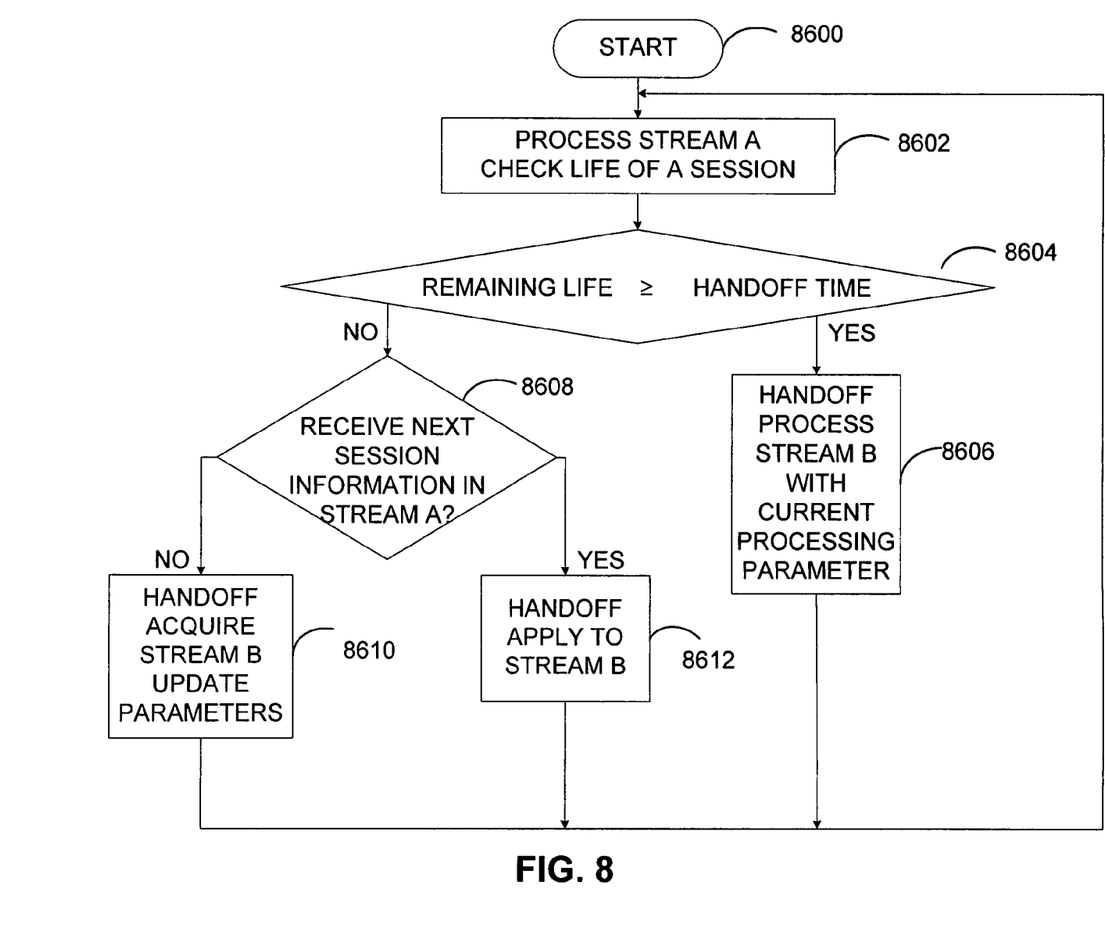
FIG. 8 illustrates re-synchronization in accordance with another embodiment.

The embodiment, utilizing the indication of a time for which the current broadcast session is valid, starts in step 8600 and continues in step 8602.

In step 8602, the subscriber station processes the old broadcast stream, decodes service option information and determines a value of a life of the session, and whether the service option information comprises protocol parameters for the next session. The method continues in step 8604.

In step 8604, the subscriber station compares the value of the life of the session with a handoff time. If value of the life of the session is greater that the handoff time, the method continues in step 8606, otherwise, the method continues in step 8608.

In step 8606, the subscriber station performs handoff, acquires the new stream, and starts processing the new broadcast stream with the current service option information. The method returns to step 8602.

In step 8608, the subscriber station continues in accordance with determination whether the service option information comprises protocol parameters for the next session as determined in step 8602. If the service option information comprises protocol parameters for the next session, the method continues in step 8610; otherwise, the method continues in step 8612.

In step 8610, the subscriber station performs handoff, acquires the new stream, and starts processing the new broadcast stream with the protocol parameters for the next session.

In step 8612, the subscriber station performs handoff, acquires the new stream, identifies and decodes service option information, and decodes the new broadcast stream with the protocol parameters acquired from the service option information. The method continues in step 8602.

One skilled in the art will appreciate that although the flowchart diagrams are drawn in sequential order for comprehension, certain steps can be carried out in parallel in an actual implementation. Additionally, unless indicate otherwise, method steps can be interchanged without departing from the scope of the invention. Furthermore, although the signaling of the service option was described in terms of in-band signaling, this was for tutorial purposes only, and use of out-of-band signaling is within the spirit and scope of the present invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A method in a communication system, comprising:
processing a broadcast session on a first broadcast channel transmitted from a first terminal in accordance with a first set of parameters;
performing a handoff to a second broadcast channel transmitted from a second terminal; and
processing the broadcast session on the second broadcast channel in accordance with the first set of parameters if a handoff period is less than life of the broadcast session.

2. The method as in claim 1, further comprising:
processing the broadcast session on the second broadcast channel in accordance with a second set of parameters if a handoff period is greater than lifetime of the broadcast session.

3. The method as in claim 1, wherein said processing the broadcast session on the second broadcast channel in accordance with a second set of parameters comprises:
acquiring the second set of parameters from the first broadcast channel.

4. The method as in claim 1, wherein said processing the broadcast session on the second broadcast channel in accordance with a second set of parameters comprises:
acquiring the second set of parameters from the second broadcast channel.

5. The method as in claim 1, further comprising:
detecting at a physical layer a need for a handoff; and
notifying higher layer about said detected need for handoff.

6. An apparatus in a communication system, comprising:
means for processing a broadcast session on a first broadcast channel transmitted from a first terminal in accordance with a first set of parameters;
means for performing a handoff to a second broadcast channel transmitted from a second terminal; and
means for processing the broadcast session on the second broadcast channel in accordance with the first set of parameters if a handoff period is less than life of the broadcast session.

7. The apparatus as in claim 6, further comprising:
means for processing the broadcast session on the second broadcast channel in accordance with a second set of parameters if a handoff period is greater than lifetime of the broadcast session.

8. The apparatus as in claim 6, wherein said means for processing the broadcast session on the second broadcast channel in accordance with a second set of parameters comprises:
means for acquiring the second set of parameters from the first broadcast channel.

9. The apparatus as in claim 6, wherein said means for processing the broadcast session on the second broadcast channel in accordance with a second set of parameters comprises:
means for acquiring the second set of parameters from the second broadcast channel.

10. The apparatus as in claim 6, further comprising:
means for detecting at a physical layer a need for a handoff; and
means for notifying higher layer about said detected need for handoff.

11. An apparatus in a communication system, comprising:
a memory; and
a device communicatively coupled to the memory and capable of performing digital signal processing configured to:
process a broadcast session on a first broadcast channel transmitted from a first terminal in accordance with a first set of parameters;
perform a handoff to a second broadcast channel transmitted from a second terminal; and
process the broadcast session on the second broadcast channel in accordance with the first set of parameters if a handoff period is less than lifetime of the broadcast session.

12. A computer readable medium storing instructions for execution by a processor, comprising:
- instructions for processing a broadcast session on a first broadcast channel transmitted from a first terminal in accordance with a first set of parameters;
- instructions for performing a handoff to a second broadcast channel transmitted from a second terminal; and
- instructions for processing the broadcast session on the second broadcast channel in accordance with the first set of parameters if a handoff period is less than life of the broadcast session.

13. The computer readable medium as in claim 12, further comprising:
- instructions for processing the broadcast session on the second broadcast channel in accordance with a second set of parameters if a handoff period is greater than lifetime of the broadcast session.

14. The computer readable medium as in claim 12, wherein said instructions for processing the broadcast session on the second broadcast channel in accordance with a second set of parameters comprises:
- instructions for acquiring the second set of parameters from the first broadcast channel.

15. The computer readable medium as in claim 12, wherein said instructions for processing the broadcast session on the second broadcast channel in accordance with a second set of parameters comprises:
- instructions for acquiring the second set of parameters from the second broadcast channel.

16. The computer readable medium as in claim 12, further comprising:
- instructions for detecting at a physical layer a need for a handoff; and
- instructions for notifying a higher layer about said detected need for handoff.

* * * * *